(12) United States Patent
Hay et al.

(10) Patent No.: US 12,112,774 B1
(45) Date of Patent: *Oct. 8, 2024

(54) VIDEO REPORT GENERATOR COUPLED TO A SYSTEM THAT MEASURES MOTION USING A CAMERA

(71) Applicant: RDI TECHNOLOGIES, INC., Knoxville, TN (US)

(72) Inventors: Jeffrey R. Hay, Prospect, KY (US); Mark William Slemp, Tellico Plains, TN (US)

(73) Assignee: RDI TECHNOLOGIES, INC., Knoxville, TN (US)

( * ) Notice: Subject to any disclaimer, the term of this patent is extended or adjusted under 35 U.S.C. 154(b) by 82 days.

This patent is subject to a terminal disclaimer.

(21) Appl. No.: 17/856,293

(22) Filed: Jul. 1, 2022

Related U.S. Application Data

(63) Continuation of application No. 16/590,324, filed on Oct. 1, 2019, now Pat. No. 11,380,363, which is a continuation-in-part of application No. 16/569,089, filed on Sep. 12, 2019, now abandoned.

(51) Int. Cl.
*G11B 27/034* (2006.01)
*G06T 7/246* (2017.01)
*G06T 11/20* (2006.01)
*G06V 10/25* (2022.01)
*G06V 20/40* (2022.01)

(52) U.S. Cl.
CPC ............ *G11B 27/034* (2013.01); *G06T 7/246* (2017.01); *G06T 11/206* (2013.01); *G06V 10/25* (2022.01); *G06V 20/40* (2022.01)

(58) Field of Classification Search
CPC ..... G11B 27/034; G06T 7/246; G06T 11/206; G06V 10/25; G06V 20/40
USPC ........................................................ 386/241
See application file for complete search history.

(56) References Cited

U.S. PATENT DOCUMENTS

| 9,570,108 B2 | 2/2017 | Goldberg |
| 2010/0259645 A1 | 10/2010 | Kaplan et al. |
| 2010/0324423 A1 | 12/2010 | El-Aklouk et al. |

(Continued)

FOREIGN PATENT DOCUMENTS

CN     106622621 A    5/2017

OTHER PUBLICATIONS

English Translation of Chinese Publication CN106622621 May 2017 (Year: 2017).*

(Continued)

*Primary Examiner* — Loi H Tran
(74) *Attorney, Agent, or Firm* — Wyatt, Tarrant & Combs, LLP; Stephen C. Hall

(57) ABSTRACT

Present embodiments pertain to systems, apparatuses, and methods for analyzing and reporting the movements in mechanical structures, machinery, and machine components using video recordings, including one or more regions of interest found in video image frames depicting an object of interest, for study of visual data indicative of the performance or condition of such structures, machinery and components by the creation of a video report file through iterative modification of a video report-in-progress referencing one or more modified visual objects associated with motion under investigation.

8 Claims, 15 Drawing Sheets
(14 of 15 Drawing Sheet(s) Filed in Color)

(56) References Cited

U.S. PATENT DOCUMENTS

| | | | |
|---|---|---|---|
| 2013/0100269 A1* | 4/2013 | Tashiro | G16H 40/67 |
| | | | 348/E7.085 |
| 2013/0307955 A1 | 11/2013 | Deitz et al. | |
| 2014/0173424 A1 | 6/2014 | Hogeg et al. | |
| 2014/0266765 A1 | 9/2014 | Neeley et al. | |
| 2016/0144404 A1 | 5/2016 | Houston et al. | |
| 2016/0300341 A1* | 10/2016 | Hay | G06F 3/04847 |
| 2017/0116725 A1* | 4/2017 | Stuart | G06T 7/246 |
| 2017/0354392 A1 | 12/2017 | Fengler et al. | |
| 2018/0034879 A1 | 2/2018 | Chegini | |
| 2020/0145533 A1 | 5/2020 | Cohen et al. | |

OTHER PUBLICATIONS https://youtube/npGtdQU1Ero; Iris M Enhancing Vision; Introducing Motion Studio; RDI Technologies.

* cited by examiner

FIGURE 13B
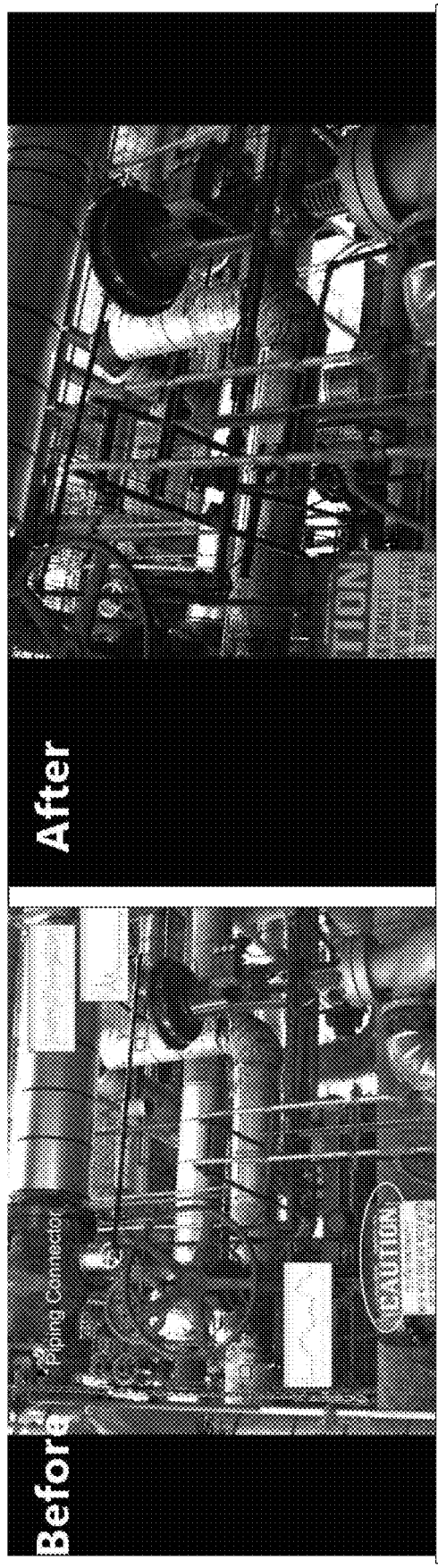
FIGURE 13A
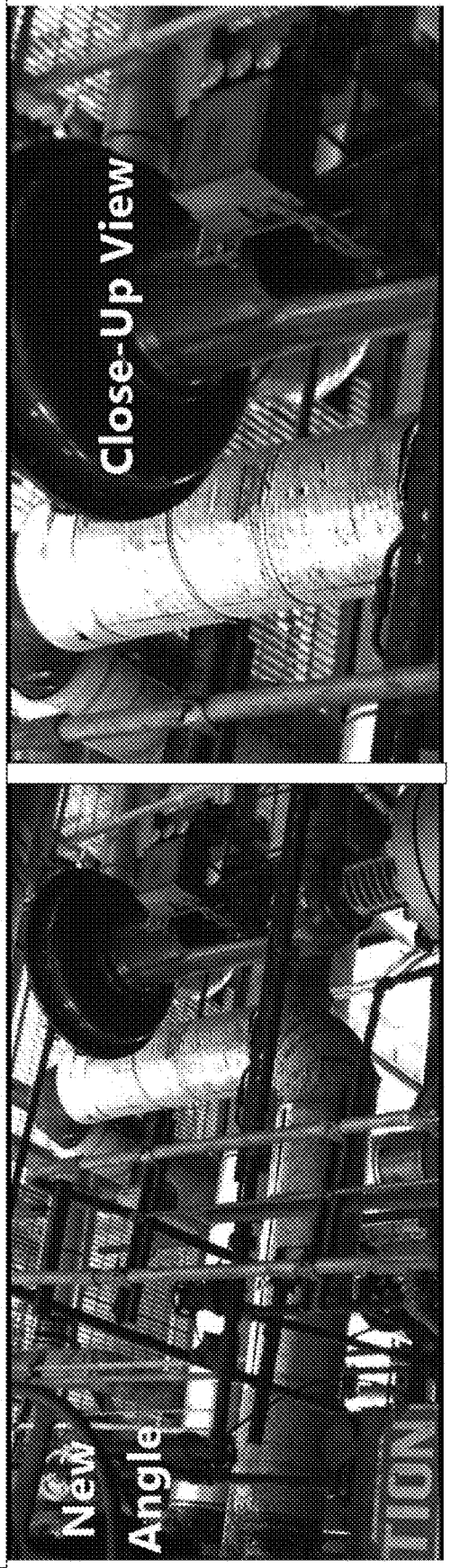
FIGURE 13D
FIGURE 13C

VIDEO REPORT GENERATOR COUPLED TO A SYSTEM THAT MEASURES MOTION USING A CAMERA

CROSS-REFERENCE TO RELATED APPLICATIONS

This patent application is a continuation application which claims benefit of and priority to U.S. Nonprovisional Utility patent application Ser. No. 16/590,324 filed Oct. 1, 2019 and issued as U.S. Pat. No. 11,380,363 on Jul. 5, 2022, which was a continuation-in-part application claiming in part the benefit of and priority to U.S. Nonprovisional Utility patent application Ser. No. 16/569,089 with a filing date of Sep. 12, 2019, the contents of all of which are fully incorporated herein by reference.

FIELD OF INVENTION

The present embodiments pertain to systems, apparatuses, and methods for analyzing and reporting the movements in machinery, machine components, and inanimate physical structures.

BACKGROUND

All physical structures, machines, and their components produce vibrations and resonances of various kinds, some of which may be characteristic of normal operation and others of which may indicate off-normal conditions, unusual wear, incipient failure, or other problems. These motions or vibrations of a mechanical structure are most often not perceptible to the human eye but can be enhanced by processing recordings made from video cameras to be visible to the human eye. This may involve changing the amplitude of motion or modifying the frequencies of interest and displaying these in modified recordings tailored to the perception of the human observer.

In the field of predictive maintenance, the detection of vibrational signatures is a key element of the diagnostic process in which the goal is to identify and remedy incipient problems before a more serious event such as breakdown failure, or service interruption occurs. Often it is desirable to visualize the motion of a mechanical unit in operation and zoom in to specific area of interest to locate the root cause of the vibration. Waveform and frequency spectrum graphs of the vibration at any position in the video can be viewed for detailed analysis.

In other instances, it is desirable to visually inspect a mechanical component to determine if physical damage is present. This can be done by stopping the motion and performing a physical inspection; however, shutting equipment down and interrupting its operation to determine the presence of a fault condition or the extent of damage is undesirable. This inspection can be accomplished without the interruption of operation by using a video recording of the component of interest and by processing the video to create a single cycle of the motion in extremely high angular resolution which may be rotated to view any angular position of interest.

All of the above further the objectives of technicians, engineers, and plant managers to quickly understand the complex motion of mechanical structures when presented with these enhanced video presentations of their equipment. Likewise, the needed actions to correct problems often become clear when the problem can be seen. The task of gaining approval and the urgency of action is easily conveyed to fellow workers via dynamic visual depictions. In the past, it has been much more difficult to convey the same information and understanding by showing graphs of complex vibration data from multiple locations on a mechanical structure. In short, within the field of predictive maintenance, there is an identifiable yet still unmet need for efficient visualization of dynamic movement of complex machinery, which may include specific machine components, and structures (i.e., structures, for brevity), providing a single coherent package of visual and other performance data obtained from multiple sources through image processing integrated into a video report. Additional desired features in the relevant field, which existing systems do not yet fully meet, certainly include a capability to visualize vibration from physical assets and make it intuitively understandable to a decision maker who has very little vibration analysis expertise. Moreover, it would be advantageous for results provided to a decision maker to be in the form of a single annotated video clips combined with graphical data or photographs compiled into an integrated visual presentation of what is happening with a mechanical structure and what needs to be done to correct a problem that is discovered. The present embodiments meet all these needs in a manner that is more beneficial than existing systems.

SUMMARY

Features, capabilities and benefits that are within the scope of present embodiments include, without limitation, those wherein a user documents the final video report resulting from the investigation of problems with a mechanical structure into a report consisting of a single video. A user may be a single person, or a group of persons working as a team such as when a projects leader directs others in the conduct of steps, operations, and activities discussed herein. It will be appreciated that the original source material can be drawn from any number of repositories where data is stored, and accessible by a user such as from a user's computer. In some embodiments, data sources are organized in a hierarchical data structure that groups all the data for a single investigation under one logical folder. In this regard, it has proven useful to employ a hierarchical data structure with at least four levels, such as Customer/Company, Areas, Assets, and Collections/Projects, with specific recordings and supplemental data residing under an individual project or study collection. When a system disclosed herein according to embodiments (i.e., application providing for unique video reports assimilated from multiple video and other sources of a machine or component's condition) is integrated with a hierarchical data structure, it facilitates the process of compiling such a unique video report. In some embodiments, what is produced by the system is saved in the form of files, for example and without limitation, mp4 files, in a format which enable visualization, filtering and amplification, and comparison of the vibration from one or more locations in the field of view. Besides mp4, other file formats in accordance with present embodiments may optionally be used, such as but not limited to 3GP, AVI, WMV, WebM, and VOB, to name a few.

Though not intended to be exhaustive, various advantages from practicing the present embodiments will include the capability to integrate visual data recordings and processing enhancements with analysis hierarchy allowing quick location of an asset where a data acquisition collection is stored with metadata information presented. This enables quick selection from a set of processed videos from a motion visualization and amplification application. Embodiments include those wherein a novel software application innovation embeds data from multiple sources, i.e., visual objects, into a single video report inclusive of mathematically enhanced video files, waveform graphs synchronized to the motion in the visual object and frequency graphs overlaid on the video, annotated composite video segments with optional synchronized voice narration. The video report generation is stored as a project which can be reopened to edit the latest saved version and generate a modified video report by one or more users.

Accordingly, in some embodiments, a video report is provided as a composite of videos of multiple video objects arranged in a customized grid of two or four videos or of multiple views taken at different times of one object such as piping, tanks, support structures, a machine or one of its components, or region of interest on one of these mechanical structures. Additionally, in some embodiments the report generation activities are recorded and can be saved as a unique project. This enables one or more users to open the project later and make changes or additions to the project and then generate a new video report file.

BRIEF DESCRIPTION OF DRAWINGS

The patent or application file with respect to the present disclosure contains at least one drawing executed in color. Copies of this patent or patent application publication with color drawing(s) will be provided by the Office upon request and payment of the necessary fee.

The drawings, schematics, figures, and descriptions contained in this application are to be understood as illustrative of steps, structures, features and aspects of the present embodiments. Accordingly, the scope of embodiments is not limited to features, dimensions, scales, and arrangements shown in the figures.

FIGS. 13A-D provide screen shots of a user monitor illustrating an annotated 2×2 composite video segment that will be played concurrently in the final video report obtained by the practice of the disclosed system, according to multiple embodiments and alternatives.

MULTIPLE EMBODIMENTS AND ALTERNATIVES

Figure 1A:
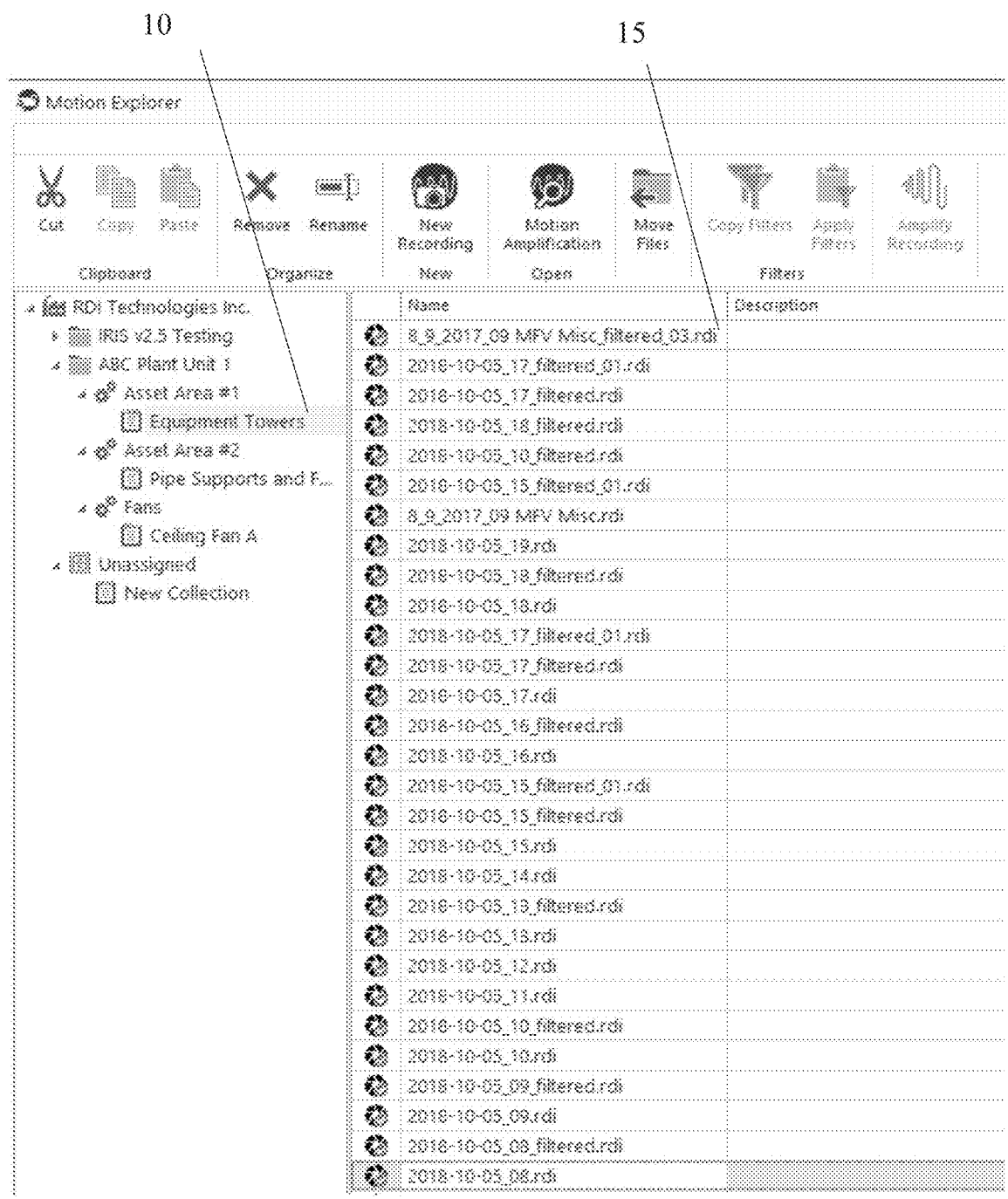
FIGS. 1A and 1B are partial views extended over two sheets which, when taken as a whole, illustrates a screen shot of a user monitor that presents an example hierarchical data structure suitable for storing, retrieving, and implementing projects in accordance with a system disclosed herein in accordance with multiple embodiments and alternatives.

In some aspects of the present disclosure, in accordance with multiple embodiments and alternatives, a user in the operation of present embodiments documents a condition of a mechanical structure, a machine or machine component with a single video report resulting from the investigation of the dynamic motion of the machine's mechanical structure and performance. Frequently, the single video report will arise from multiple source videos or video segments. An original source can be drawn from any data accessible from a user's computer, for example data stored thereon in a hierarchical data structure. In an exemplary embodiment, such a hierarchical data structure organizes various data sources into groups within one logical folder. In operation, a single investigation may consist of numerous video recordings of the mechanical structure taken from different physical positions. It is expected that a user may start a recording process from a location from which the system is able to record the entire mechanical structure, or those portions which are of interest, in a field of view taken from one or more cameras. In this way, a user takes recordings from several vantage points to capture video information of machine and component motion in all three dimensions. This is advantageous and in some respects even necessary because a camera operating from a single position captures motion in the two directions orthogonal to the line of focus on the object.

In use, the visual data acquired with one or more cameras may be amplified and reviewed on site to determine more localized regions of the mechanical structure which exhibit possible anomalous vibratory behavior. As desired or needed, analysis occurring in substantially real time in the field or later at a remote location may involve one or more of stabilizing or filtering the video, visually amplifying the motion or freezing the motion at selected points in time, and measuring the displacement and dominant frequencies of interest at one or many regions of interest in the field of view. A system for configuring a video processing system to automatically amplify pixel intensity values for improved visualization is contained in U.S. Pat. No. 10,062,411 titled "Apparatus and method for visualizing periodic motions in mechanical components," issued Aug. 28, 2018, the contents of which are expressly incorporated herein by reference for all purposes. Among other incorporated teachings contained therein, this patent describes visually amplifying the recorded motion of a component or structure by steps that may include: choosing a reference frame, comparing additional frame depicting the component's recorded motion to the reference frame, thereby resulting in one or more difference frames, and creating a new set of difference frames by multiplying pixel intensity values found in the difference frames by a chosen amplification factor. Doing so allows the creation of a new set of images having the original reference image plus the amplified difference frames that represent motion, only as visually exaggerated movement of the component or structure. For example, in the context of the present application, such adjustments may be accomplished using the motion visualization/amplification application whose operation console is presented in FIG. 2. Here, a user may annotate video segments with text, shapes or plots to focus attention on the motion of interest in the video. A user may draw one or more regions of interest on any distinguishable component in a selected frame of the video recording.

Figure 3B:
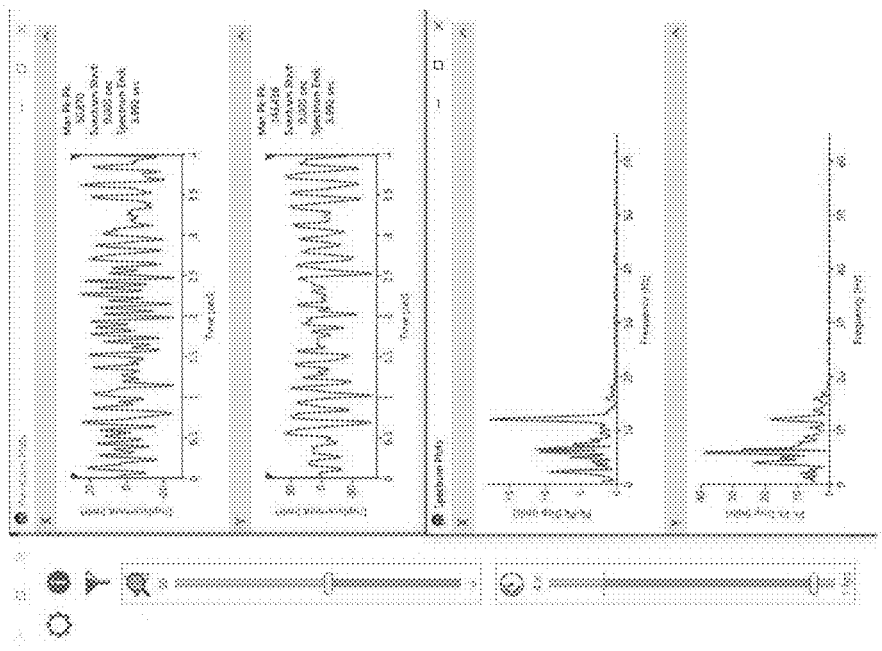
FIG. 3B is a visual representation of waveform and frequency spectrum information of the motion at these regions, according to multiple embodiments and alternatives.
Figure 3A:
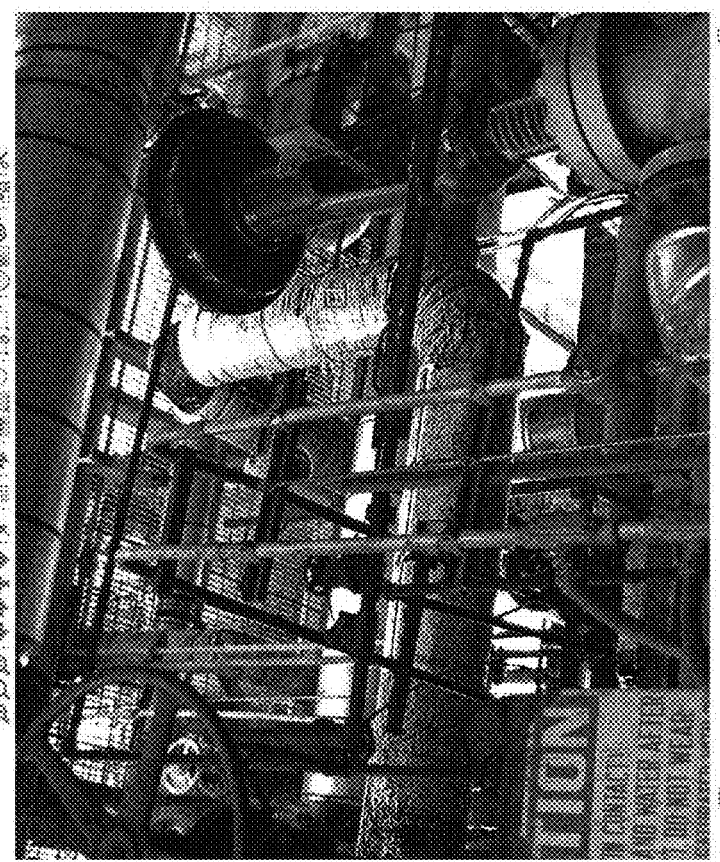
FIG. 3A is a screen shot of a user monitor illustrating one or more regions of interest of the machine identified by the user as a red rectangle in the image, according to multiple embodiments and alternatives.
Figure 5:
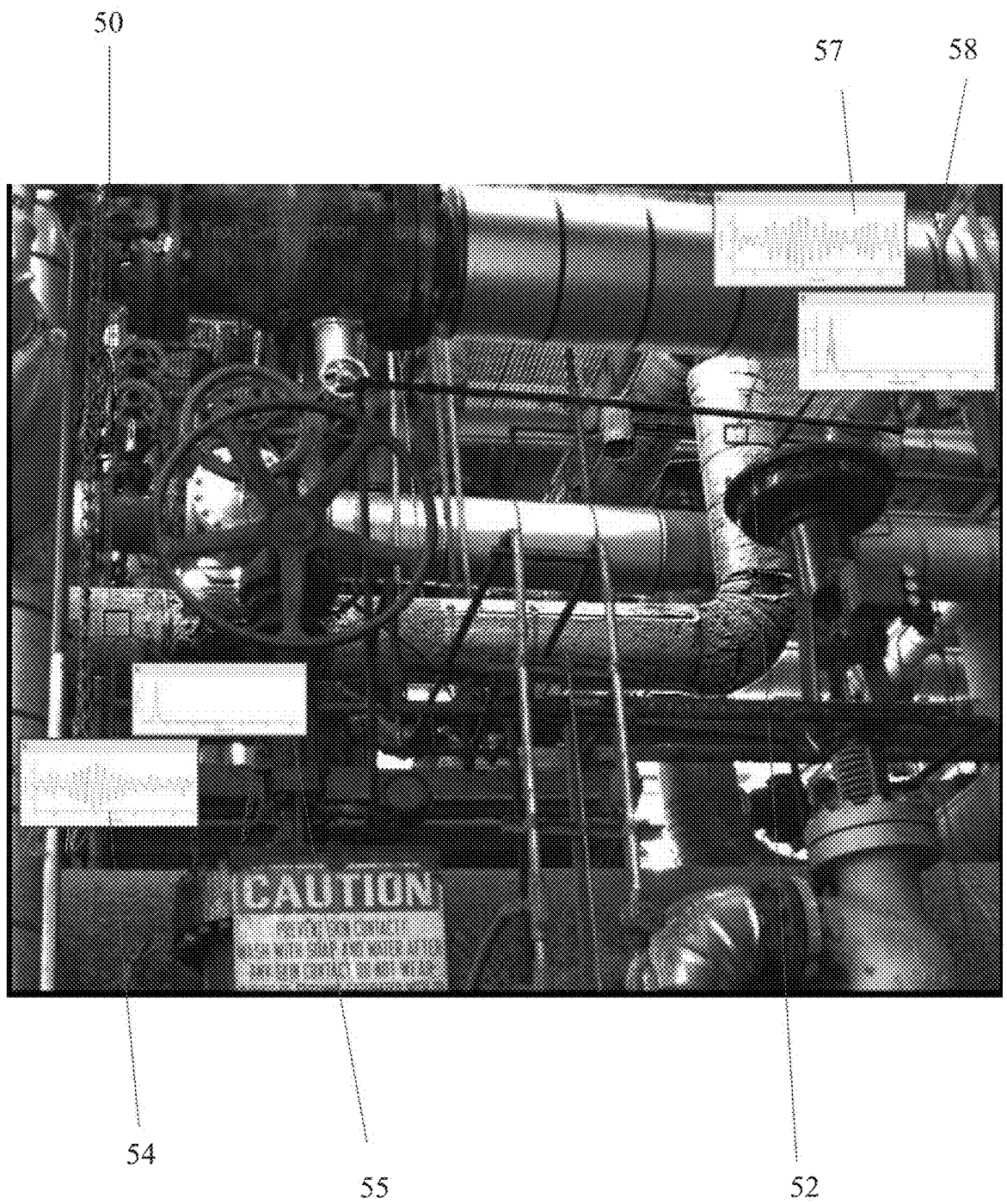
FIG. 5 is a screen shot of a user monitor illustrating the ability of a system to tag one or more regions of interest and provide associated synchronized waveform and frequency spectra of the motion at these regions, according to multiple embodiments and alternatives.

Also, a video processing system with a user interface configured to allow a user to draw a perimeter or region of interest within the video frame so that analysis may be focused on that region is contained in U.S. Publication No. 20160217587 titled "Apparatus and Method for Analyzing Periodic Motions in Machinery" published Jul. 28, 2016, the contents of which are expressly incorporated herein by reference for all purposes. In the analysis of a portion or component of a machine in a region of interest, a user may construct a time waveform or frequency spectrum of the vibration at the position the region occupies. In some embodiments, graphical presentation of these depictions is accomplished by superimposing them over the video as illustrated in FIG. 5. Alternatively, a system according to multiple embodiments and alternatives is configured to show the graphical depictions in separate windows or panels from the video itself, as shown in FIGS. 3A and 3B.

In some embodiments, a synchronized cursor is shown on the waveform plot which moves dynamically to match a particular position on the waveform with a particular frame as it is displayed in the video playback. A cursor can appear as, for example, a dot, an arrow, a caret or other like symbol configured to follow dynamically a position on a graph. As desired, both waveform and spectral graphs can be visualized in a separate window (as in FIG. 3B) or embedded in a video output file alongside and as the image frames are played back. Review of this illustration of the video shows the position of the waveform synchronized to the video frame being displayed. The user can also graphically select a point on the waveform plot and move the video to that precise position in order to study the motion.

In this way, in some embodiments video segments, or an entire video report, are prepared by a user operating the system in which the displayed motion already has been selectively filtered and amplified. In some embodiments, the depictions of dynamic motion are shown with a playback speed that makes the frequencies of interest easily perceptible to the human eye and which are associated with the particular waveform information or frequency spectra, or both, associated with the movement seen in the frame.

As part of the motion studio application, processor-executed program instructions automatically synchronize the motion shown in the video images to the waveform of the motion which is superimposed into a window overlaying the video or a window next to the video as the images are played. In some embodiments, one or more regions of interest are defined by a user; the application software searches for the best pixels in each region of interest and determines the displacement in both the x and y axes which are orthogonal to a line between these pixels and the position of the camera. This graph of motion contains one point (i.e., X, Y coordinate) which has been extracted from each frame of the video. When the video is replayed, a position of a cursor on the graph is moved to correspond with the frame from which the data point was measured. This information is embedded in the software-generated video such that the visual frames and quantified measured motion data (which may be presented as a waveform, for example) play in a synchronized presentation. In some embodiments, the system is configured to accomplish this taking each individual frame that is captured of the component's motion and associating it with the particular point on the waveform representing the displacement in the region of interest as identified by the cursor on the graph. Since this process can be done for two or more regions of interest in the newly generated video, this allows a user to filter the video for a specific frequency and visually present the phase relationship between the motion of different structural components or different positions on the same component in the video. In some embodiments, the system is configured to provide this association by creating a relational database in which individual frames matched to the time of the video are linked to a particular X and Y coordinate on a waveform showing displacement (Y-axis) against time (X-axis).

By associating the frames to a point on the waveform, the system allows a user, via a user interface, to advance the playback of the video to later frames or reverse the playback to earlier ones, and the synchronization configured into the program instructions moves the cursor on the waveform accordingly to correspond with the frames that appear after advancing or reversing the playback. The corollary also is true, in that the program instructions configure the system so that if a user advances or reverses the cursor to a different point on the waveform, the video will depict the frames correspondingly from that new point.

This capability offers several advantages. It allows a user to advance to the position of positive or negative peaks to give special attention to the physical frames depicting the motion at the maximum points of displacement, or other points on the waveform where a disturbance in the routine motion occurs (e.g., an episode when unusual vibrations or some instability appeared temporarily). Additionally, some components, for example a reciprocating shaft or a rotating blade, have typical waveforms characterized by sinusoidal motion with naturally occurring high and low peaks of displacement marked by a consistent frequency and wave-length. In cases of motion disturbance, however, the waveform may deviate from sinusoidal motion, thus assisting in the diagnosis of current or impending problems. For example, if the waveform in one place exhibits an irregular wave shape indicative of unusual vibrations or some instability of motion, a user can advance the cursor to that point on the waveform to see the motion in frames that correspond around that point. Another benefit is the ability to put video side by side on the screen next to their respective waveforms. The side by side might be of separate videos taken of the same component or showing the same region of interest from cameras as two different perspective, or it could be from a single camera but taken at different times. In the latter situation, the motion in the two videos can be synchronized by aligning the phase of waveforms measured for the same point from the two videos collected from a different perspective. In this way, differences in motion along the cycle of motion can be studied and shown in a final video report.

Accordingly, present embodiments allow the rate of visual motion of the component to be matched to the exact position on the graphed waveform of the motion, and have the two aspects of motion study be synchronously linked at all times. To Applicant's knowledge, there is no conventional system that provides for a waveform next to video playback that allows such control by a user.

Still further, in some embodiments, a menu or list is presented that contains a variety of options from which a user may select. Such options provide a user with added ability to determine the information that populates a video report with an annotation that includes graphical information, as the video report is being created or edited. Non-limiting examples of such a list include optional selections to populate a region depicted onscreen with a time waveform, spectrum, orbit plots, transient plot or other form of a plot. After making this selection, a user is presented with further options to select additional regions from within the video showing the structure or machine in motion, as depicted at a particular time or phase of the video, as part of the graphical annotation. For example, the menu may show different colors selections that may be applied over different regions of interest, for example by a user clicking, dragging the cursor over, or otherwise highlighting the desired region, with each color representing a different measurement location. To further illustrate this capability, in one exemplary application, a user chooses the color red and applies it over a portion of the screen, which may include a region of interest. In this way, based on the choice of color and the portion where it the color applied, the annotation is then populated with data derived from the region of interest on the screen. Similarly, some embodiments include a menu option enumerated with a number value associated with a measurement of motion depicted within the video. A user also is able to choose a direction the selected plot is associated with, for example the X or Y direction. Capabilities of the system and method may also include a user graphically linking the annotation to a measurement location, for example with a line or arrow showing correspondence between a location in the video frame where depicted motion is measured, and the annotation location showing the graphical information associated with the measurement. Other capabilities offered in some embodiment include user ability to animate a plot showing graphical information upon video playback, and later during an exported MP4. For example, the waveform cursor may move within the plots, with each sample in the waveform synchronized to the corresponding frame being displayed.

Some embodiments allow a user to close these menus and reopen one or more of them later, with the option to change any of the selections listed in the preceding paragraph, and have the annotation change correspondingly based on the form of the graphical information, the location of the measurement in the motion depicted, or the property being measured. This ability may facilitate the creation of multiple videos of the same structure or machine in motion. In this way, a user may be presented with multiple locations where motion is characterized, measured, annotated, or depicted from within the video to select from to populate a video report. Likewise, a user may populate an annotation with specific information, for example a waveform, and then export an MP4 video. Then the user may change the annotation to show only a spectrum and export a different video of the same structure or machine in motion.

For additional flexibility in presentation, some embodiments enable a user to move an annotation and menu anywhere on the screen and dynamically resize the annotation window. The act of clicking on an annotation region of the motion depicted may activate the menu so that it appears for the user. As the user moves to a new region (i.e., selecting a different portion of the video as a new region of interest) from which data is derived, the view on the screen dynamically updates the annotation information. For example, if a user selects a new region of interest different from an earlier one, and a waveform of displacement over time, for example, was measured for the earlier one, the system will measure the waveform again for the new location because its data will be different from the earlier one and the plot must be updated. The new waveform will then be shown in the annotation in place of the waveform that was presented earlier.

Additionally, multiple annotation locations may exist in the video, each showing a different type of plotting (e.g., frequency spectrum in one place, and waveform in another place of the video). Multiple annotations may be linked to a single region of interest measurement location or different region of interest measurement locations.

In some embodiments, a single annotation menu exists that governs all annotations used in the video report. This single annotation menu may change the data displayed in an annotation region depending on what annotation region is highlighted. A further example of user control is provided in those instances where the inventive system and method enable a user to designate two annotation regions, each associated with a different region of interest in the motion being depicted. If a first region is selected for annotation, for example by a user clicking, dragging the cursor over, or otherwise highlighting the desired region, a change of the menu options would further modify the graphical and measurement information in this first annotation region, but would not change any information in a second annotation region corresponding to a different region of interest.

In some embodiments, the result of practicing a system disclosed herein is a single video report assembled from multiple sources of recorded information taken over time. If desired, the format for the result is an mp4 video capable of being exported and transmitted, with full screen presentations of the data enhanced by additional processing (e.g., motion amplification). In some embodiments, as shown in FIGS. 13A-D, respectively, a video report or a portion of the composition in accordance with present embodiments is shown as side by side comparisons with the unmodified recorded data taken at the same point in time. Alternatively, recordings are captured which freeze the periodic motion of components and play back the motion with very high angular resolution facilitating a physical inspection of the component.

Advantageously, the practice of a system or methods in accordance with present embodiments is accomplished without disturbing normal operation of a machine. These dynamics of motion as seen in components from a region of interest are shown statically (i.e., frozen) or they are shown in slow motion relative to other components outside a region of interest. These also can be transmitted and exported as mp4 videos. Still in accordance with multiple embodiments and alternatives, photographs may be captured as snapshots of any of the recorded videos or mp4 files containing an assembly from parts of videos, and these may be included in a video report created with appropriate annotation to highlight the regions of interest. Introductory slides may be created to introduce each video segment that is included in the report or descriptive annotation can be superimposed directly on the video segments. Another feature and capability of the present embodiments is for files created from field acquisition to be stored in a single folder using a hierarchical data structure that facilitates the organization and management of data, which may otherwise be unwieldy due to a long accumulation from numerous investigations by users of the system disclosed herein.

As shown in FIGS. 1A and 1, taken together, a hierarchical data structure suitable for present embodiments may have at least four levels. Such an application facilitates the creation and management of a four-level structure such as outlined above and greatly simplifies that management of the extremely large number of files that accumulate with the use of the system on multiple investigations. When such a hierarchy is integrated with particular tools for creating a video report in accordance with present embodiments, it facilitates the process of compiling a final video consolidating informational segments from multiple sources into a single report.

Figure 1B:
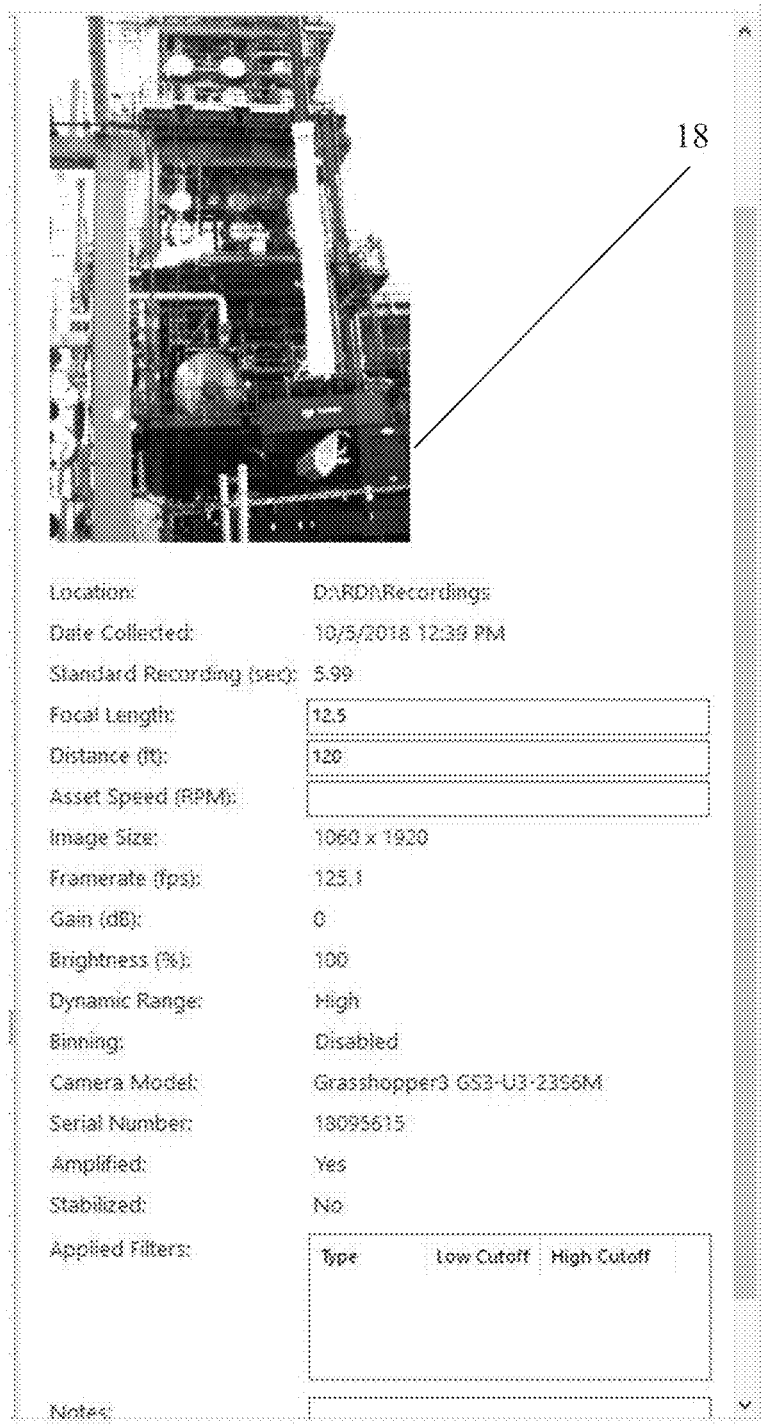

In this regard, FIG. 1A, providing an example hierarchical data structure for storing and retrieving for projects, is divided into a screen having at least a first panel 10, a second panel 15, with a third panel 18 of the composite screen shot on FIG. 1B. In the illustrated embodiment, first panel 10 provides a hierarchical data structure with four levels to organize recordings associated with a troubleshooting project. Second panel 15 is of a pane showing all the recordings and analyzed recordings in this study collection, such that the hierarchical data structure comprises two or more levels of organization. Third panel 18 offers a user a preview of a single frame from a recording to facilitate selection for analysis, with additional information and metadata below the frame (in the embodiment shown, "location" and "date collected" are listed first) as part of the panel if desired. Non-limiting examples of metadata also may include data acquisition type (Standard or High Resolution), data acquisition settings, camera identification, GPS coordinates of the location of the camera, user-supplied descriptions and notations, and mathematical processing techniques applied to modify a video.

Figure 2:
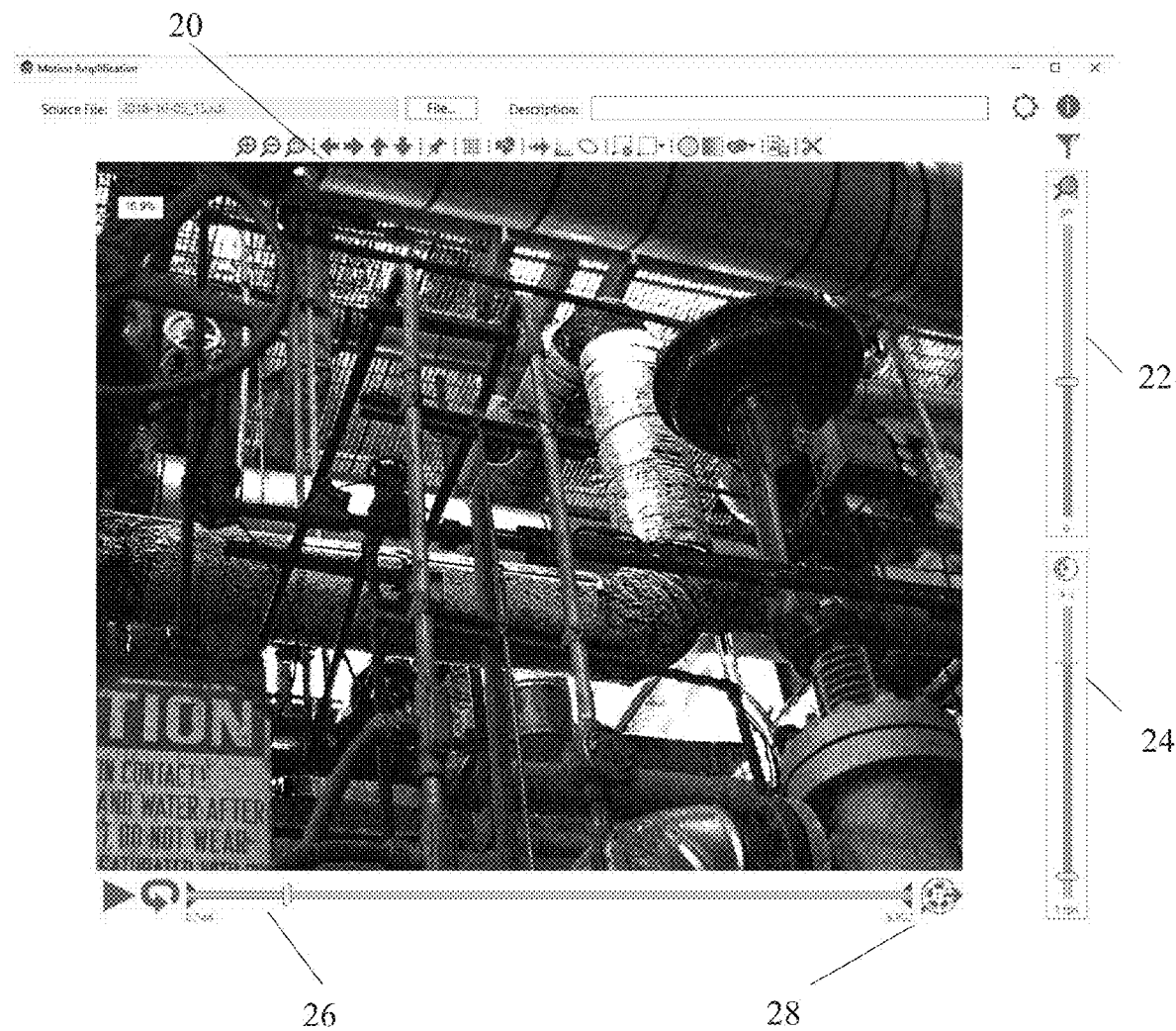
FIG. 2 is a screen shot of a user monitor illustrating an example of preparing and presenting dynamic information (e.g., vibratory) about machines and structures from a collected set of video recordings, according to multiple embodiments and alternatives.

FIG. 2 illustrates how a user may employ processing features achieved by machine readable program instructions (software) operating on the processor to reformat the dynamic information in a more preferred visual presentation and to export this as snapshots and mp4 video segments that will be compiled into a video report. Such processing features may include enhancements such as motion visualization and amplification. In FIG. 2, toolbar 20 presents icons representing user-implemented tools to analyze video and highlight important information. A vertical slider bar, shown as first vertical slider bar 22, allows a user to change the amplification factor on enhanced motion depicted in a video segment leading to the video report. Another vertical slider bar, shown as second slider bar 24, allows a user to change playback speed (e.g., slowing, making static, or increasing) as a further example of enhancing the depiction of motion for the video report. Progress of video playback is tracked and visually represented by indicator bar 26. Additional user tools may include an export button 28 by which video content, which has been processed to highlight motions of interest, is exported to another interested party.

In similar fashion, FIGS. 3A and 3B illustrate how the execution of program instructions running on the system offers motion visualization to identify one or more regions of interest and to measure the waveform and spectrum of the motion (seen in FIG. 3B), at locations depicted in the video seen in FIG. 3A. These capabilities enable a user to quantitatively characterize the motion being presented in the video portion.

Figure 4:
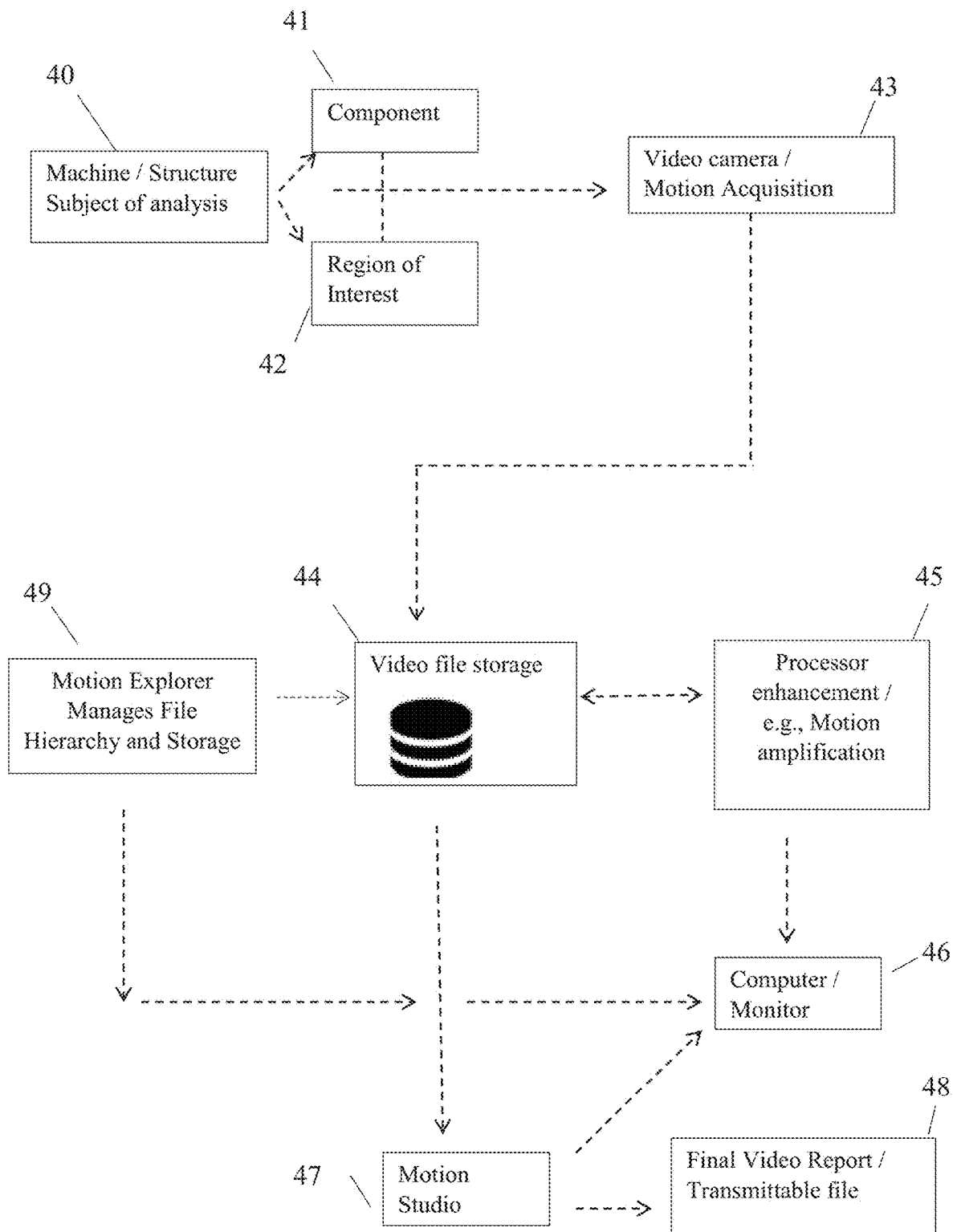
FIG. 4 is a block diagram illustrating several exemplary system components of the disclosed system, according to multiple embodiments and alternatives.

FIG. 4 provides a block diagram of system components which are used in some embodiments. In one embodiment, a machine 40 is the subject of the analysis leading to generation of a final video report from myriad source files stored on the system. The analysis may be of the machine itself, or of a single component 41 of the machine, or of a particular region of interest 42 on the machine. Analysis of a region of interest is discussed further in this description, including in connection with FIG. 5. Now with further reference to FIG. 4, with use of an image acquisition device, which can be a video camera 43, a visualization of motion is acquired and stored in the system, or in the cloud, for example as a file. As desired, this motion acquisition application obtains recordings of a mechanical structure, a machine, a component, or region of interest from one or a plurality of vantage points. Preferably, the video camera is (or video cameras are) positioned with an unobstructed view of a selected portion of the mechanical structure, machine, component, or region of interest to obtain a video feed.

Associated with the motion acquisition feature, in some embodiments a file storage 44 is created for storing the data from a given analysis, which in some embodiments is a hierarchical structure. Through the hierarchical data structure, for example as shown in FIG. 1, a user may search and obtain the appropriate files or other data to include in a report. In some embodiments, the activities surrounding the input to and searching within the hierarchical data structure is referred to as motion explorer shown in block 49 of FIG. 4. Motion enhancement is then executed with one or more processors or microprocessors operating on the system, as depicted at block 45 of FIG. 4. Through the system's execution of program instructions, raw acquired video can be enhanced for improved motion visualization, i.e., stabilized (to offset movement in the camera 43), filtered to depict movement at a particular frequency, amplified to make disturbances in the movement of a structure readily discernible on video even though not perceptible to the human eye, or modified with a lower or higher playback speed to facilitate discernment of disturbances in the movement. In this way, the raw video files are enhanced through a variety of optional techniques in accordance with the present embodiments to highlight or give greater emphasis to a problem in the machine, structure, or component, and the processed files are stored for later inclusion in a final report file.

From this point, having a plurality of files stored in the hierarchical data structure 49, a user operating from an electronic device 46 (such as a computer with monitor, a tablet, a laptop, or the like) builds the video report as discussed in several other figures including FIGS. 7-11. In non-limiting fashion, processing components that explore, search, enhance, and amplify the video data acquired at block 43 may include, or be communicatively coupled to, computer readable storage media such as, for example memory, which may optionally include random access memory (RAM), non-volatile RAM (NVRAM), optical media, magnetic media, semiconductor memory devices, flash memory devices, mass data storage device (e.g., a hard drive, CD-ROM and/or DVD units), cloud storage, and/or other storage as is known in the art. Additionally, without limitation, such processing components may include, or be communicatively coupled to, memory having computer readable and executable program instructions, rules, and/or routines which, when executed by the processor, cause the video depiction of physical structures from an analysis to be organized and modified into a final video report as described herein. As desired, the processor may be coupled to complementary components (not shown), for example user interface screens and monitors (e.g., for the showing of video segments comprising video frames), key pads, and operational indicators responsive to user input for controlling the movement of cursors, boxes to identify regions of interest, and playback speeds, to name some examples. In some embodiments, a user interface is a graphical user interface that displays various analytical results along with the video segments comprising a plurality of video frames.

Accordingly, in an exemplary operation, a user acquires, visually investigates and manipulates the recordings, quantifies the motion and determines how to best describe the nature of the machinery problem using segments of the processed videos by using the applications discussed herein, including motion acquisition, motion explorer, motion visualization, and motion studio. In the latter application, motion studio depicted as block 47 in FIG. 4, a user constructs a video report into a single video file, e.g. in mp4 format, from multiple video source files created during the handling and processing of acquired data and video files. Advantageously, the video report project once begun can be saved and reopened repeatedly until a final video report 48 satisfactory to the user and beneficial to the recipient is completed and capable of being played back or transmitted to another electronic device.

Figure 10:
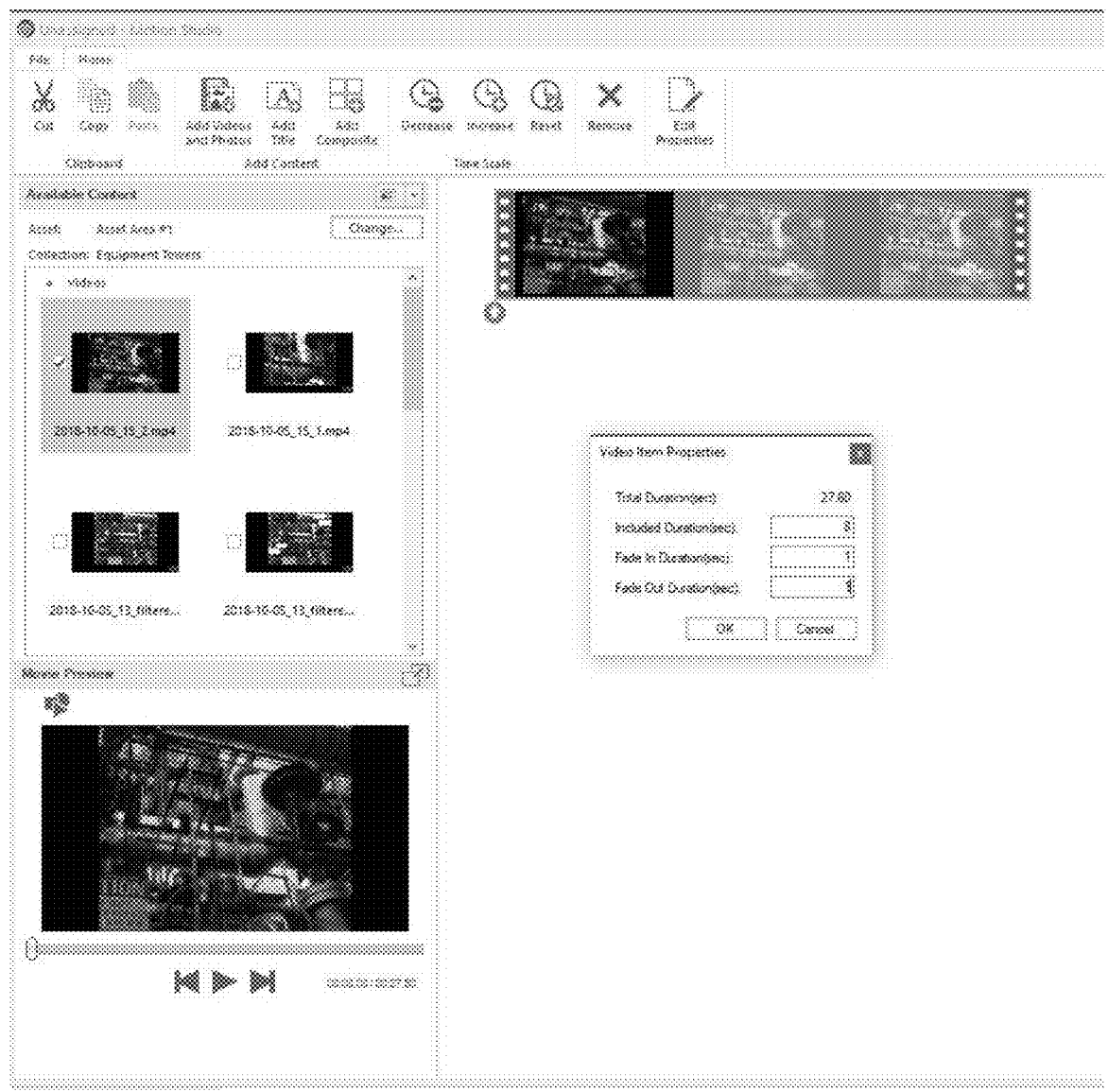
FIG. 10 is a screen shot of a user monitor illustrating an editing feature of the disclosed system, according to multiple embodiments and alternatives.
Figure 11:
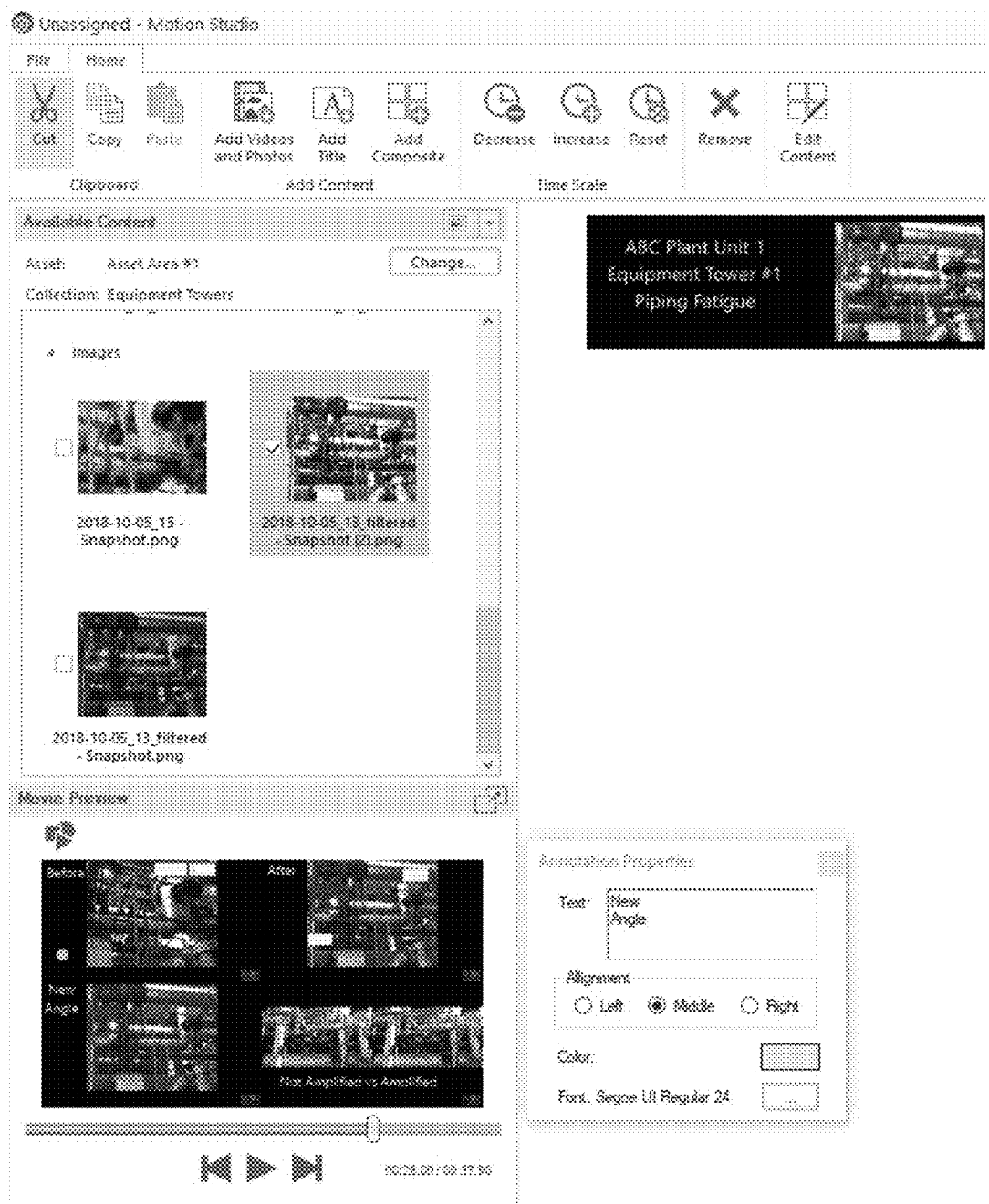
FIG. 11 is another screen shot of a user monitor illustrating the disclosed feature for annotating videos that have been selected to be included in the video report, according to multiple embodiments and alternatives.

Broadly speaking, then, a process of creating a video report in accordance with multiple embodiments includes but is not merely limited to organizing the visual information created during the analysis process as photographic snapshots, mp4 video segments into a single video report which best tells the result of the investigation. A user begins the process by identifying the study collection folder which is the repository of the acquired video files and the files generated during the analysis portion of the process as illustrated and further discussed below for FIGS. 1A and 1B. System features allow a user to select mp4 video segments or pictures from one or more data collection folders to add to the video project as shown in FIGS. 10 and 11. A selected mp4 can be further annotated, abbreviated, or combined into one or more composite mp4 videos. The portion of such videos to be displayed and the fade in and out period can be edited to highlight the most informative segment of the original video as illustrated in FIG. 10, for example.

FIG. 5 illustrates certain features of the present embodiments in preparing an integrated video report documenting the condition of the machine. FIG. 5 provides a first region of interest 50 and a second region of interest 52. A waveform 54 and frequency spectrum 55 are viewed adjacent to the first region of interest. In turn, the second region of interest has its own waveform 57 and frequency spectrum 58 viewable adjacent the component in the video image. In this way, the system allows a user to document conditions of a machine and components by adding text or shapes annotation into the video and tagging one or more regions of interest with the associated synchronized waveform and frequency spectrum of the motion at these locations. As stated previously, results of this type of video processing can be embedded into an exported mp4 video segment or final video report.

In some embodiments, the act of exporting a video report is accompanied by a video export preview screen, giving a preview of the exported video. It may show what the exported video will look like based on annotation choices made during preparation of the video report, for example showing whether or not a waveform representing graphical annotation information is overlaid on the video. Other options may include but are not limited to, choosing export quality and size, side by side video showing amplified or unamplified video, layout options of horizontal or vertical placement of amplified and unamplified video, addition of a logo on the video, overlay of text. Accordingly, such an export preview screen may contain information of the exported video such as file size, length and export location. Export location may be chosen from this screen, as well. The option to include data in the export may be given, such as overlaying, or adjacent placement of plots derived from measurements within the video.

In some embodiments, a user is able to select which plot to display in an exported video and from which measurement location the plot originates from. The plot orientation location and region of interest may be denoted by a color coding or enumerated list. In terms of process, allowing a user to locate such a region of interest on the video playback is handled by the program instructions in similar fashion with the annotating of screens with plots and graphical information. However, the ability to do so at the time of export, without having to return to earlier versions of the work or start over at the beginning, is another example of the flexibility afforded by the present embodiments. Accordingly, as prior selections are modified, the preview pane is updated to show a preview of the video that will be exported. For example, the preview may show a video on the left, with a spectrum on the right, which is changed to a waveform. A user may also be given an option, using color features or other designations uniquely identifying a particular location, to show the region(s) of interest that were previously selected in the exported video report, to indicate locations where measurements were made. Further annotations of an optional nature may include text, lines, arrows, geometric shapes, images, plots or videos. In various embodiments, such options may occur in the video creation and editing phase or in a software program provided to an end reviewer doing analysis of a video report created by a user.

Still further, in some embodiments, a user is provided an option to export a snapshot of the image. That snapshot may contain the current frame. The snapshot may include further content as well, such as but not limited to waveforms, region(s) of interest, spectra, orbits, annotations, or other measurements or overlays. The snapshot may automatically be linked to a database, in which a particular location within the video report may be user defined or associated with a physical recording location of the structure or machine (e.g., designated by a sticker or icon) which has been saved in the database.

Figure 6:
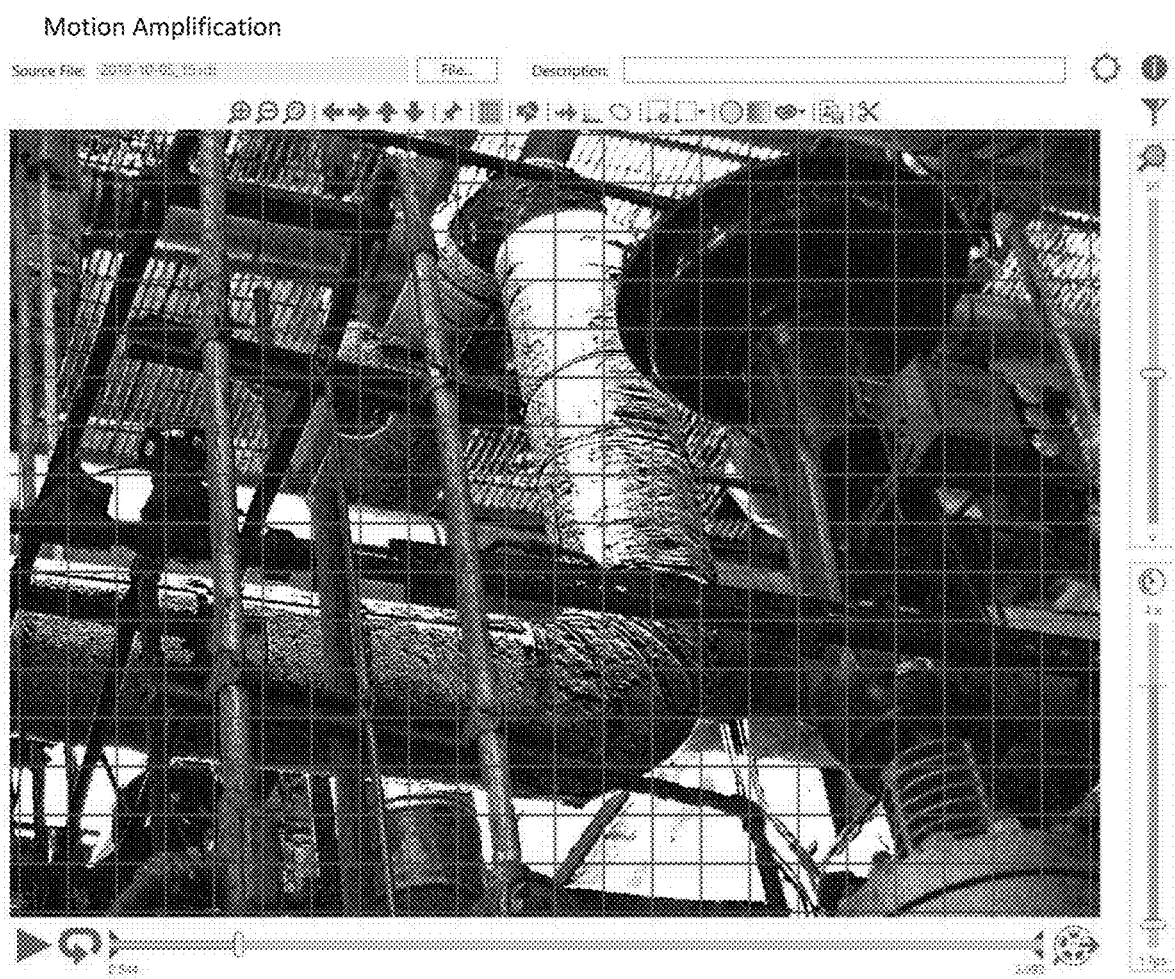
FIG. 6 is a screen shot of a user monitor illustrating the ability of the disclosed system enable a user to identify and highlight spatial areas of interest by superimposing a stationary spatial grid on a video of machinery that has been enhanced by processing, such as by amplification, according to multiple embodiments and alternatives.

Now turning to FIG. 6, in some embodiments, a user operates the system with the aid of program instructions that, when executed, identify or highlight spatial areas of interest by superimposing a stationary spatial grid on the video that has been processed, e.g., by amplification of component areas found in a region of interest. Similar kinds of features like those described in FIG. 2 can be configured with the application, as illustrated in FIG. 6.

Figure 7:
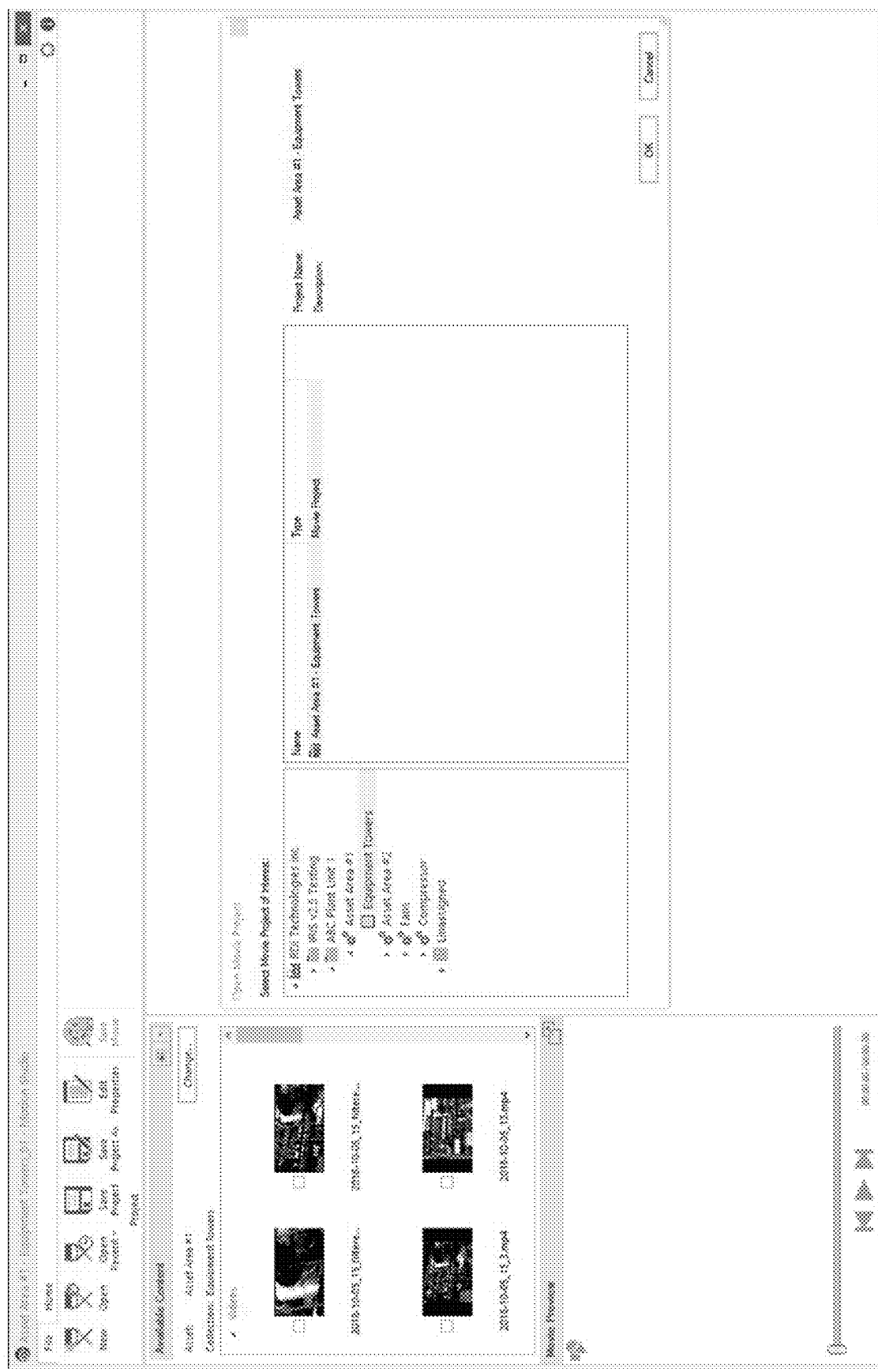
FIG. 7 is a screen shot of a user monitor illustrating a console used in the operation of the disclosed system by which a project is started or selected, including data collection folders accessible to obtain multiple sources for video report generation, according to multiple embodiments and alternatives.

FIG. 7 illustrates a user console to select or start a project and select a data collection folder for a project. Under the "Available Content" heading are images of a machine or component (in this case, from the Equipment Towers collection) and next to it shows the hierarchical organization of the collection of visual objects. The project defines all of the elements that are to be assembled into the final integrated video report, such that one or more persons are able to return to the project at any time to make edits or insertions that may be needed due to additional information resulting from subsequent sessions of video acquisition or processing. This prevents a user from having to start all over every time that he needs to edit the video report file. Modified or enhanced video report files can be regenerated very quickly due to the information stored.

Figure 8:
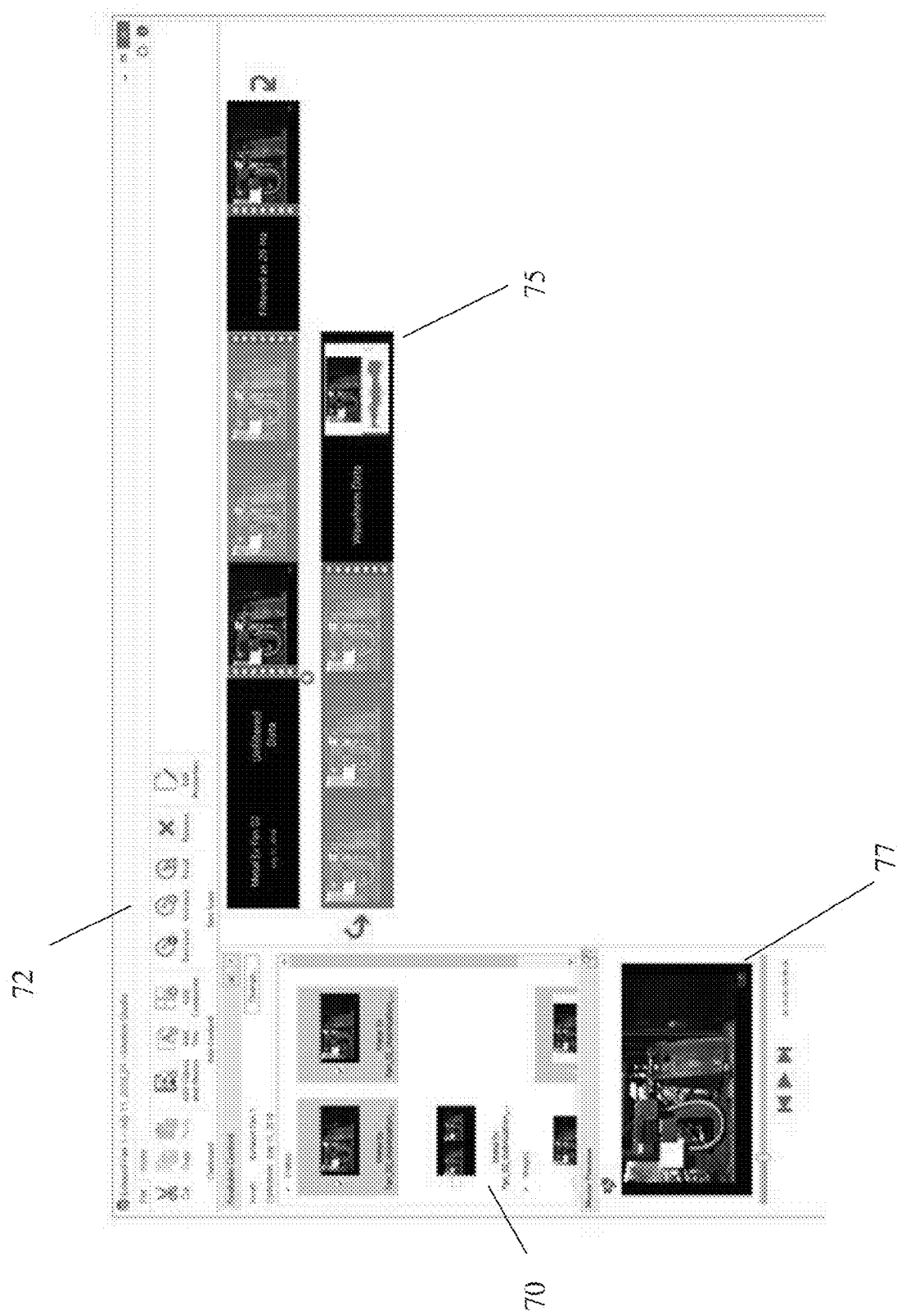
FIG. 8 is a screen shot of a user monitor illustrating an application workspace provided by the disclosed system divided into a number of panes offering the features discussed below, according to multiple embodiments and alternatives.

FIG. 8 illustrates an application workspace divided into a number of panes which show available recordings, allow selection and previewing a specific recording which is a candidate to include in the video report, and tools to annotate, edit, or create composite videos that will be organized into the final video report. In some embodiments, the arrangement shown in FIG. 8 allows selection and previewing a specific recording which is a candidate to include in the video compilation (sometimes referred to herein as the final work product or, more simply final video report), and tools to annotate, edit, or create video segments in progress that will be organized into the video report for sharing. This creates a visual presentation documenting the dynamic problem(s) in a physical asset that may include narration, slides, photographs, video segments show the actual and/or magnified motion with identifying annotation pinpointing the motion of concern including vibration graphs synchronized with videos. For example, in some embodiments sound overlay is provided such that voice narration can be superimposed over the video. In this way, the user, preparing a report on the status of machinery, may include observations and findings in verbal form as opposed to having those appear in a separate written report or, at best, as pop up text boxes appearing on screen.

In FIG. 8, pane 70 is a section that offers thumbnail images of all videos and images associated with a particular collection and available for inclusion in preparing a video report, including a movie preview pane. In turn, pane 72 illustrates a ribbon appearing in the workspace as shown to a user whereby movies, photos, title slides, and other composition slides are accessible to add to a particular project with the scope of present embodiments. In FIG. 8, pane 75 delineates the video report workspace as it is being assembled, and a preview pane 77 is provided to show a user how the video report appears at a given stage of progress (a preview pane is likewise shown in FIGS. 9, 10 and 11 as well). In some embodiments, as shown, the contents of this pane provide a variety of inputs ranging from visual, to waveform, to spectral and others, and the content stored here and available for a project may be reordered via drag and drop.

Figure 9:
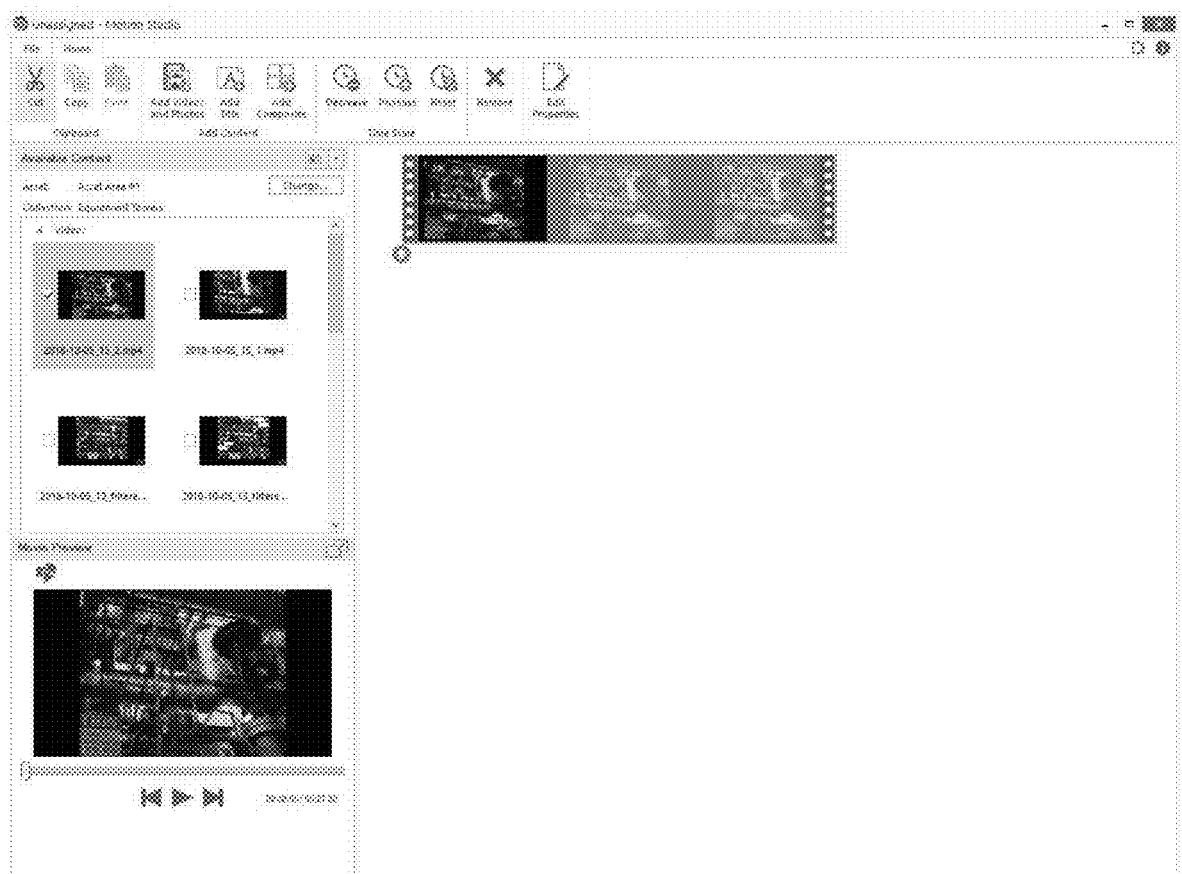
FIG. 9 is a screen shot of a user monitor illustrating a console used in the operation of the disclosed system, according to multiple embodiments and alternatives.

FIG. 9 is a representative illustration of a user console by which a project progresses through the selection of pictures or video segments which can be in mp4 format, from a data collection that are added to the video project. In some embodiments, video sections are dragged from the "Available content" section and dropped into a sequence of video segments or still frame images as shown on the right of the figure. FIG. 9 also depicts a preview pane showing the progress of the video compilation. The sequence of video segments can be graphically rearranged in the preview pane.

In like fashion, FIG. 10 continues to represent how a project progresses, wherein video item properties and other metadata are provided in the console itself so a user can gauge total length of the video compilation and determine other visual effects.

In an editing feature of the disclosed system as illustrated in FIG. 11, a user console enables annotation, including text, shapes, and images, to be overlaid on existing mp4 videos. A feature seen in FIG. 11 not yet discussed in other figures appears in the lower left pane and includes side by side comparisons of images that have been modified by undergoing processing as disclosed herein (e.g., amplification) against the unmodified recorded data taken at the same point in time, and here is shown an indicator bar giving the amount of time expired in the video and amount of time remaining. In accordance with present embodiments, the unmodified and modified (e.g., not amplified and amplified) are run concurrently with each other. Alternatively, the side by side comparisons could be of images that have undergone one form of processing, such as motion amplification, side by side with images that have undergone another form of processing, such as filtering out of unwanted frequencies. In this way, embodiments allow for constructing at least two visual objects obtained from the stored set of video objects in a composite presentation, which are played concurrently according to user specifications. As desired, a user can prepare a report that combines this type of comparison of runs side by side with a grid feature on the motion that has been enhanced with motion amplification. Consistent with discussion herein in connection with FIG. 6, in this way a range of displacement can be further studied in relation to the sectors on the grid, aided by amplification.

Figure 12A:
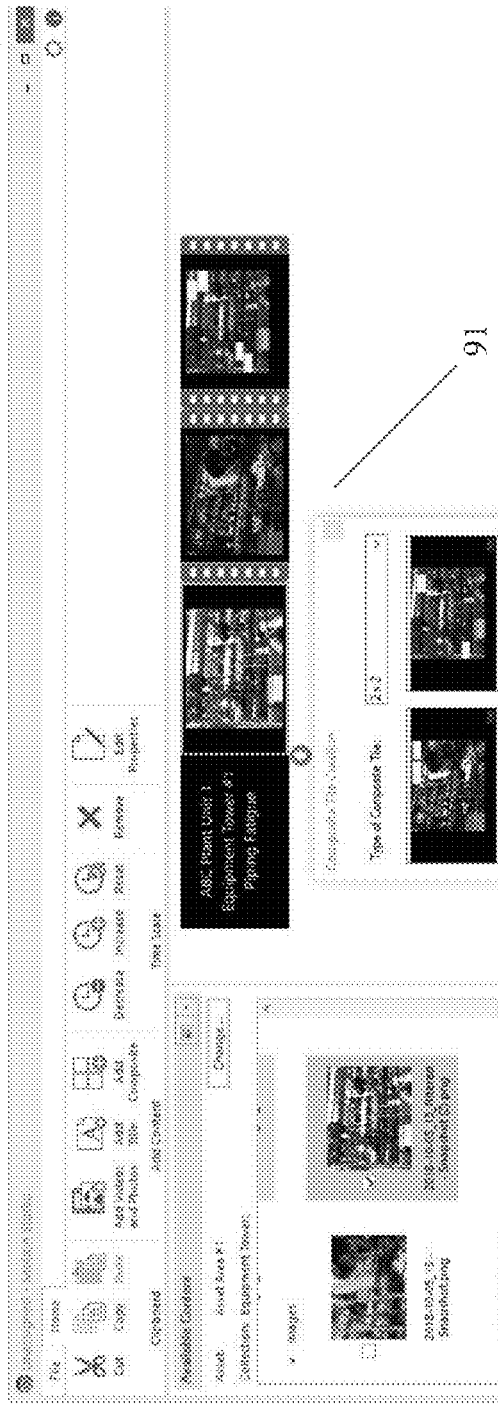
FIG. 12A and FIG. 12B illustrate a screen shot of a user monitor in progress of selecting videos to construct a composite video segment to be incorporated into an image-processed video report, according to multiple embodiments and alternatives.
Figure 12B:
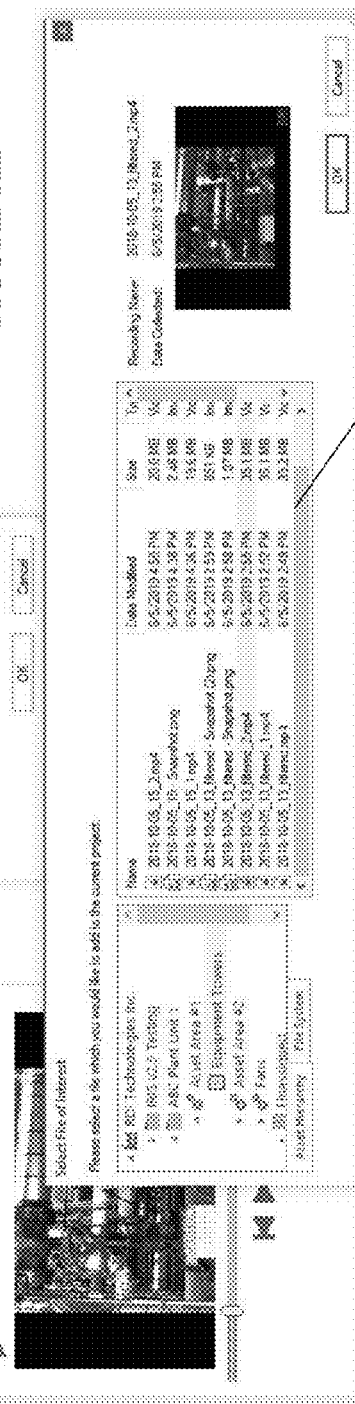

FIGS. 12A and 12B offer a screen shot of a user composing a 2×2 composite video by selecting the video content for each of the four panes which will be displayed concurrently in the final integrated video report. FIG. 12A depicts a content pane 91 showing available thumbnails and thumbnails that are in use, and FIG. 12B shows a file selection pane 92 which in some embodiments is arranged in a hierarchical data structure. In some embodiments, the selected videos may represent data collected before and after repairs, unamplified and amplified data, different vantage points, or videos filtered to highlight different frequencies. Individual panes in the composite presentation can be annotated to provided clarity as the content displayed. In an alternate embodiment, other composite formats are available such as a composite of two videos, arranged either side by side or stacked.

Figure 14:
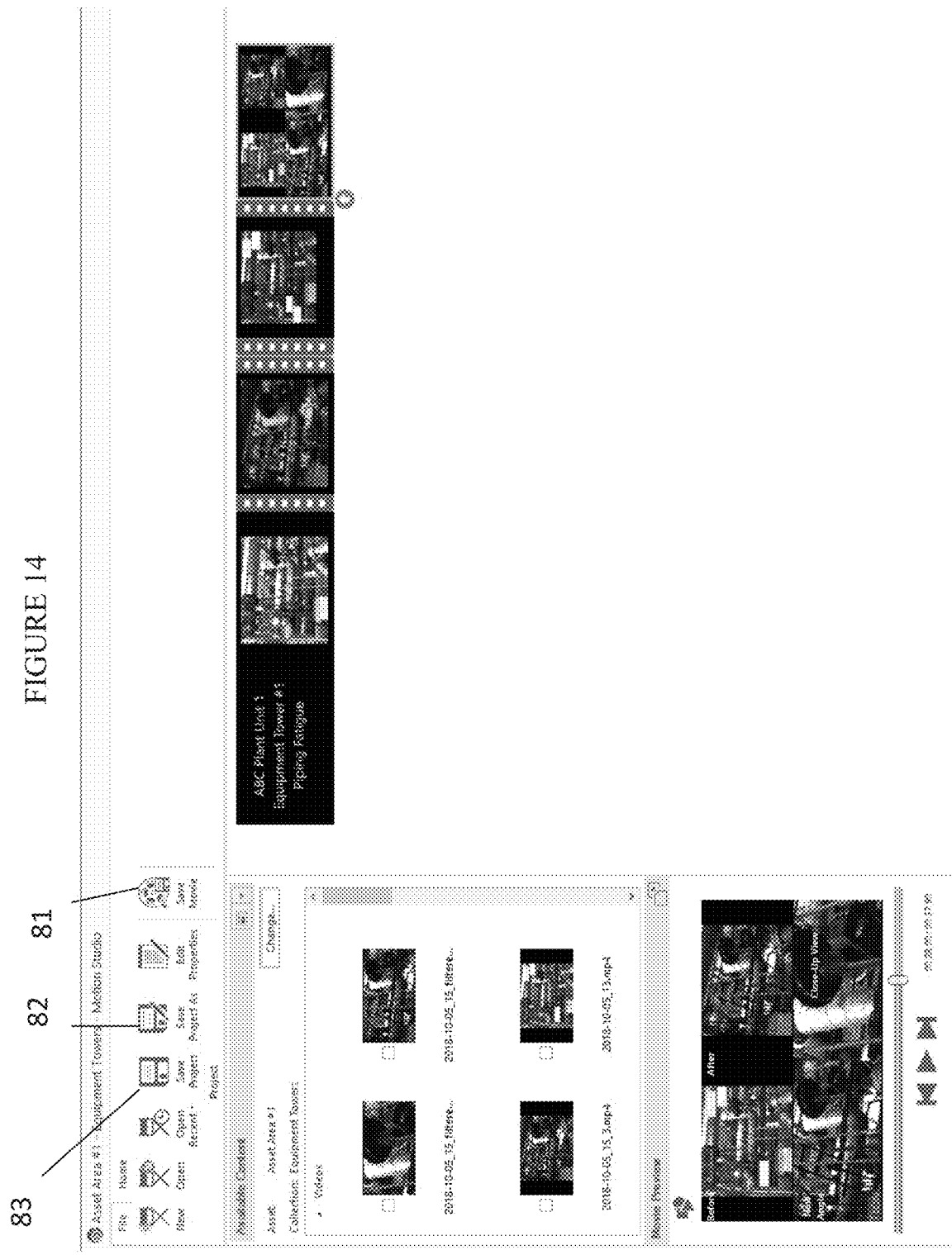
FIG. 14 is a screen shot of a user monitor illustrating how the final integrated video report is generated and menu buttons for saving Motion Studio project, according to multiple embodiments and alternatives.

FIGS. 13A-D present the individual portions of a screen shot of a user monitor illustrating the four elements that could be included a 2×2 composite video segments of a final video report. In non-limiting manner, these portions illustrate the versatility of the disclosed system, for example by changing the viewing angle and/or as side by side comparisons of modified and unmodified selections. For example, a desirable feature of present embodiments is the capability to create video reports with 2-4 individual videos which will play back simultaneously. An advantage is being able to compare videos which have been processed differently, taken at different locations, or taken at different points in time. It can be extremely helpful to present data that was acquired before and after a physical modification to the mechanical structure to verify the effectiveness of the actions taken to alleviate a problem. As desired, the particular content of each video can be labeled in the composite presentation. In this regard, the ability to annotate and create composite videos is illustrated in FIGS. 12A-13D. When the user is satisfied, the final video report is exported as a single mp4 file which can be provided to the client or decision makers, for example using the button labeled 81 in FIG. 14 and to save a new project or to save the latest changes in an existing project using buttons labeled 82 and 83 in FIG. 14, respectively. Accordingly, a system in accordance with embodiments and alternatives disclosed herein works to allow a user to complete his project and transmit one video file summarizing his findings to his client or a decision maker in his own organization.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of embodiments and alternatives are meant to illustrate, rather than to serve as limits on the scope of what has been disclosed herein. The descriptions herein are not meant to limit the understanding of the embodiments to the precise forms disclosed. It will be understood by those having ordinary skill in the art that modifications and variations of these embodiments are reasonably possible in light of the above teachings and descriptions.

What is claimed is:

1. A method for creating a video report file from an original set of video recordings which documents findings of dynamic vibratory motion of a machine or a structure under investigation combining a plurality of visual objects to enhance a visual representation of the structure or machine while it is in motion, comprising:

obtaining from a video camera the original set of video recordings comprising two or more video recordings of the structure or machine having a first video file format and taken with the video camera at different locations while the structure or machine is moving, wherein moving includes at least the structure or machine experiencing vibratory motion;

storing a set of visual objects comprising a plurality of video frames from the original set of video recordings, wherein the set of visual objects enhances a visual perception of the motion of interest in at least one spatial area where motion of interest occurs in the original set of video recordings;

identifying one or more visual objects to include in the video report file by sequentially accessing one or more of the set of stored visual objects in a viewing window, selecting one or more visual objects of interest, and modifying one or more of the selected visual objects by at least one of: applying at least one mathematical algorithm to the one or more retained visual objects to create at least one modified visual object in a second video file format and having at least one property different from a corresponding visual object in the original set of video recordings, or adding a waveform, orbit, spectral, or transient graph with quantitative measurements of the vibratory motion of the structure or machine from at least one of the spatial areas where motion of interest occurs in the original set of video recordings;

displaying in a preview window one or more of the selected visual objects to include in a video report-in-progress and allowing the presentation format, order, starting point, or duration of the selected visual objects that are displayed to be modified;

creating a project file from the selected visual objects and the at least one modified visual object, wherein the project file defines a plurality of elements for constructing the video report file, and wherein the plurality of elements include at least an identification of one or more visual objects and at least one modified visual object to include in the video report file, and an order and format of presentation for the plurality of elements in the video report file;

enabling the video report-in-progress to be saved, reopened and iteratively modified while the video report-in-progress is opened either by modifying the one or more visual objects, by changing the order or format of presentation for the plurality of elements identified, or by removing from the video report-in-progress any of the plurality of elements identified; and updating the project file as the video report-in-progress is iteratively modified to construct the video report file.

2. The method of claim 1, wherein the second video file format is at a lower resolution than the first video file format, and further comprising converting the second video file format the at least one modified visual object was created in to a third video file format at a higher resolution than the second video file format.

3. The method of claim 1, further comprising configuring a user interface to allow a user to draw a region of interest within at least one video frame from which the one or more visual objects are identified.

4. The method of claim 1, wherein the project file comprises one or more visual objects from the set of visual objects, each having a resolution that is the same as the original set of video recordings and which is higher than the resolution of the at least one modified visual object.

5. The method of claim 4, wherein the project file further comprises photographs, and annotation slides with narration.

6. The method of claim 1, wherein prior to constructing the video report file, one or more visual objects from the set of visual objects are converted to a lower resolution and the video report file comprises both visual objects from the set of visual objects and at least one modified visual object in a format with a single resolution lower than the resolution of the first video file format.

7. The method of claim 6 wherein the resolution of the video report file is the same resolution as the resolution of the second video file format.

8. The method of claim 1, wherein a spectral graph is added and the spectral graph is a frequency spectrum which is displayed with at least one of the modified visual objects.

\* \* \* \* \*